US008813035B2

(12) United States Patent
Mathew et al.

(10) Patent No.: US 8,813,035 B2
(45) Date of Patent: Aug. 19, 2014

(54) PARADIGM FOR CONCURRENCY TESTCASE GENERATION

(75) Inventors: Ciby Mathew, Toronto (CA); Aslam F. Nomani, Markham (CA)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 13/408,477

(22) Filed: Feb. 29, 2012

(65) Prior Publication Data

US 2013/0227528 A1    Aug. 29, 2013

(51) Int. Cl.
*G06F 9/44*    (2006.01)

(52) U.S. Cl.
USPC .......................................................... 717/124

(58) Field of Classification Search
None
See application file for complete search history.

(56) References Cited

U.S. PATENT DOCUMENTS

| | | | |
|---|---|---|---|
| 7,000,224 B1 * | 2/2006 | Osborne et al. | 717/125 |
| 7,310,798 B1 | 12/2007 | Gunara et al. | |
| 7,496,654 B2 * | 2/2009 | Corbin et al. | 709/224 |
| 7,512,933 B1 | 3/2009 | Tortosa et al. | |
| 7,539,980 B1 | 5/2009 | Bailey et al. | |
| 7,926,035 B2 | 4/2011 | Musuvathi et al. | |
| 7,996,815 B2 | 8/2011 | Godwin et al. | |
| 2010/0070230 A1 * | 3/2010 | Kumar et al. | 702/119 |
| 2011/0131002 A1 | 6/2011 | Sheye | |
| 2011/0131550 A1 | 6/2011 | Burckhardt | |
| 2011/0271284 A1 * | 11/2011 | Simonian | 718/102 |

OTHER PUBLICATIONS

Ur, Samuel; "Testing Concurrent Software", http://testandverification.com/files/Bristol_parallel_software_dec_2010.pdf, 2009.

* cited by examiner

*Primary Examiner* — Li B Zhen
*Assistant Examiner* — Sen Chen
(74) *Attorney, Agent, or Firm* — North Shore Patents, P.C.; Michele Liu Baillie

(57) ABSTRACT

A concurrency testcase generation includes providing a concurrency testcase template for features built into a concurrency testcase generation infrastructure that requires no compilation. Through the concurrency testcase template, testers may input directives for managing activities of concurrent threads, directives for configuring timing tests by the concurrent threads, directives for configuring responses to errors by the concurrent threads, and directives for configuring logging of data for the concurrent threads. The directives for managing activities of the concurrent threads may include directives for managing creation of the concurrent threads, directives for customizing actions of each concurrent thread, directives for managing a sequence of the concurrent threads, directives for exchanging of information between the concurrent threads, and directives for configuring throughput for the concurrent threads. The inputted directives collectively define the concurrency testcase. In this manner, the testcase generation infrastructure masks the programming complexities of the features from testers.

3 Claims, 4 Drawing Sheets

```
spawn 5
  1: // thread 1 does something
  2,3: // threads 2 and 3 do something else
  *: // threads 4 and 5 do something different
end
```

FIG. 3

```
spawn( <n> [,pool] ) begin
  // do work
end
```

FIG. 4

```
start_time = current time           // record start time for benchmarking
spawn( 10 ) begin
  1:                                // thread 1 populates a table repeatedly
        loop() begin
                insert rows
        end
  2,3:                              // threads 2 and 3 query the table simultaneously
        loop() begin
                select rows
        end
  4:                                // thread 4 tests online database backup
        backup db online
        send_to 5 1000              // then signals thread 5 with a delay value
  5:
        delay = receive_from 4      // thread 5 blocks waiting on signal
        reorg table online          // then drives table reorg
        sleep delay                 // then sleeps upto delay
        end_all                     // finally shutdown spawn
  *:                                // remaining threads update the table simultaneously
        loop() begin
                update table
        end
end
elapsed_time = current time - start_time
```

FIG. 5

PARADIGM FOR CONCURRENCY TESTCASE GENERATION

BACKGROUND

Test tools are used to verify the correct functioning of software and modifications to existing software. Verifying the correctness of software may involve numerous tasks, including the testing of concurrency. Concurrency testing is a core requirement in the software industry and is accomplished through the execution of testcases. A testcase is a set of conditions under which a tester will determine whether an application or software system is working correctly. However, the writing of effective concurrency testcases is outside the programming skills of most testers. The concurrency test requirements instead are often assigned to specialized developers. This leads to other problems, such as the unproductive expense of waiting on a developer to program a testcase, and the risk of losing test requirements in translation.

Traditional programming languages like C, Java, and Perl offer an interface for concurrency testing. Unfortunately this interface requires a steep learning curve to master. The concurrency enablement in these languages is a thread which is the smallest unit of processing that can be scheduled by an operating system. The threading model for these languages is complex due to the number of concepts that have to be mastered, including a deep understanding of the thread model, thread pools, thread life cycle, critical sections, semaphores, synchronizing threads, race conditions, memory usage, etc. During testcase maintenance, the testers further have to depend on the same developers to fix defects and to change test coverage. These costs and risks multiply when the test requirements result in multiple test products, each involving concurrency.

SUMMARY

According to one embodiment of the present invention, a method for concurrency testcase generation by a computer system comprising a processor, comprises: providing a concurrency testcase template for features built into a concurrency testcase generation infrastructure that requires no compilation; receiving directives input through the concurrency testcase template for managing activities of concurrent threads; receiving directives input through the concurrency testcase template for configuring timing tests by the concurrent threads; receiving directives input through the concurrency testcase template for configuring responses to errors by the concurrent threads; and receiving directives input through the concurrency testcase template for configuring logging of data for the concurrent threads.

In one aspect of the present invention, the receiving of the directives input through the concurrency testcase template for managing the activities of the concurrent threads comprises: receiving directives input through the concurrency testcase template for managing creation of the concurrent threads.

In one aspect of the present invention, the receiving of the directives input through the concurrency testcase template for managing the activities of the concurrent threads comprises: receiving directives input through the concurrency testcase template for customizing actions of each concurrent thread.

In one aspect of the present invention, the receiving of the directives input through the concurrency testcase template for managing the activities of the concurrent threads comprises: receiving directives input through the concurrency testcase template for managing a sequence of the concurrent threads.

In one aspect of the present invention, the receiving of the directives input through the concurrency testcase template for managing the activities of the concurrent threads comprises: receiving directives input through the concurrency testcase template for exchanging of information between the concurrent threads.

In one aspect of the present invention, the receiving of the directives input through the concurrency testcase template for managing the activities of the concurrent threads comprises: receiving directives input through the concurrency testcase template for configuring throughput for the concurrent threads.

System and computer program products corresponding to the above-summarized methods are also described and claimed herein.

BRIEF DESCRIPTION OF THE SEVERAL VIEWS OF THE DRAWINGS

FIG. 3 illustrates an example spawn syntax according to the present invention.

FIG. 4 illustrates an example thread pool syntax according to the present invention.

FIG. 5 illustrates an example testcase received from a tester through the concurrency testcase template according to the present invention.

DETAILED DESCRIPTION

Figure 1:
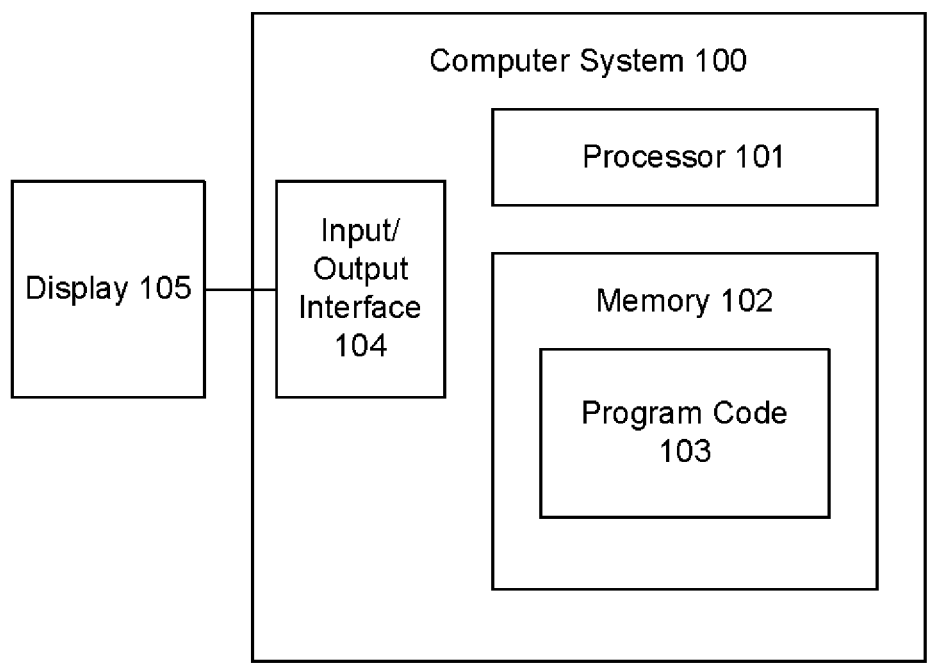
FIG. 1 illustrates an embodiment of a computer system for concurrency testcase generation according to the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

FIG. 1 illustrates an embodiment of a computer system for concurrency testcase generation according to the present invention. The computer system 100 is operationally coupled to a processor 101 and a computer readable memory 102. The computer readable memory 102 stores computer readable program code 103 for implementing the various embodiments of the concurrency testcase generation infrastructure according to the present invention. The computer system 100 further comprises an input/output interface 104 coupled to input/output devices, such as a display 105.

The embodiments of the concurrency testcase generation infrastructure of the present invention mask the programming complexity of concurrent testcases from testers. The concurrency testcase generation infrastructure comprises an interface in the form of a template for the features built into the concurrency testcase generation infrastructure that requires no compilation. The tester is able to input directives into the template for controlling the features, which collectively define the concurrency testcases. In this manner, the testcase generation infrastructure masks the programming complexities of the features so that testers can create and control concurrency testcases that typically require the higher skills of a developer. In addition, the tester, being familiar with the testcase, can easily evolve the testcase to change test coverage to find more defects or to accommodate new requirements.

Figure 2:
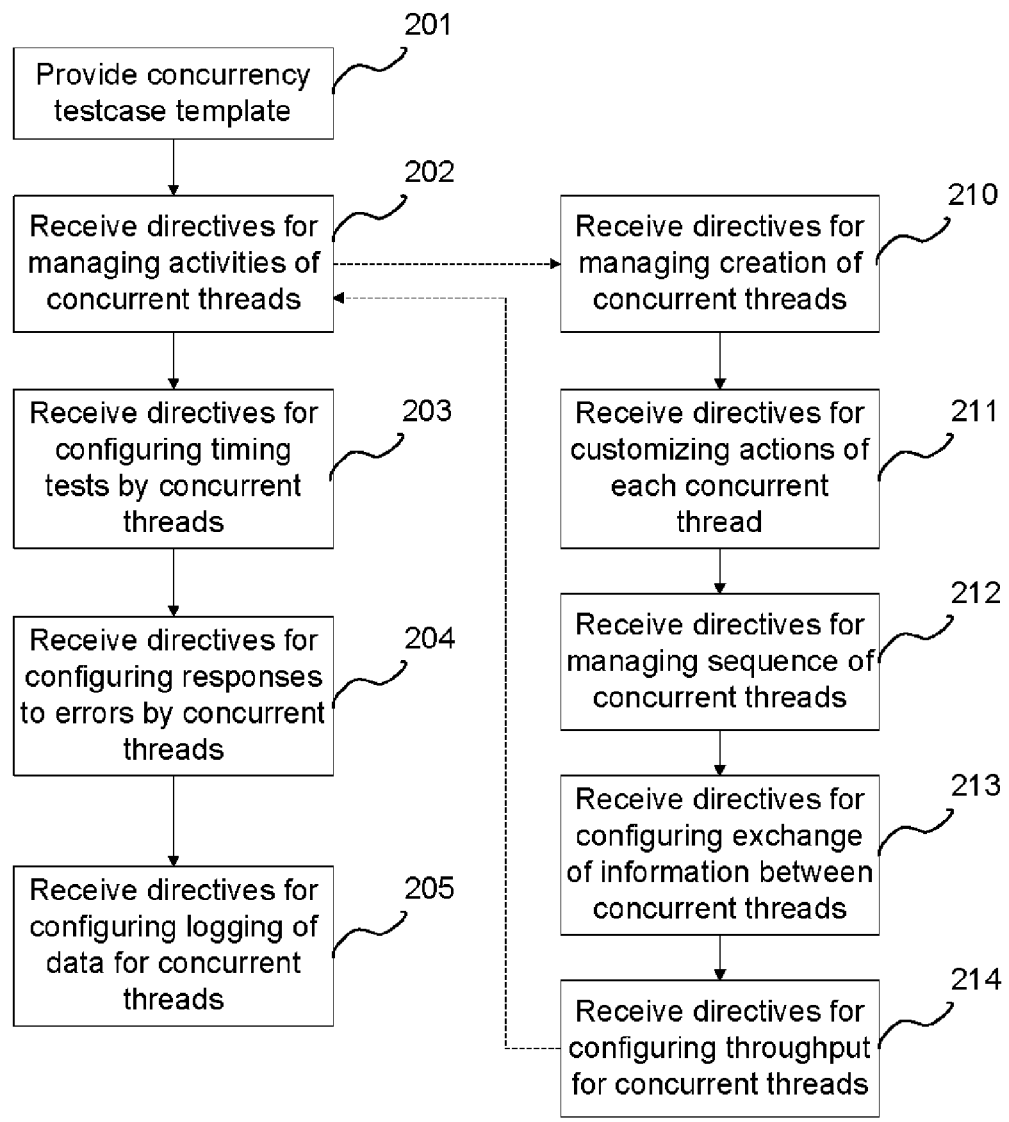
FIG. 2 is a flowchart illustrating an embodiment of a method for concurrency testcase generation according to the present invention.

FIG. 2 is a flowchart illustrating an embodiment of a method for concurrency testcase generation according to the present invention. The computer system 100 provides the concurrency testcase template (201) on the display 105 as the interface to the testcase generation infrastructure. Through input into the template, the testcase generation infrastructure receives directives for managing the activities of concurrent threads that will execute the testcase (202), for configuring timing tests performed by the concurrent threads (203), for configuring responses to errors by the concurrent threads (204), and for configuring the logging of data for the concurrent threads (205). The directives for managing the activities of the concurrent threads may include directives for managing the creation of the concurrent threads (210), for customizing the actions of each concurrent thread (211), for managing the sequence of concurrent threads (212), for exchanging of information between concurrent threads (213), and for configuring the throughput for the concurrent threads (214). The features described with reference to FIG. 2 are described in more detail below.

Through the concurrency testcase template, a tester may input directives for managing the creation of concurrent threads that perform the tasks of the testcase (210). In this embodiment, the directive is provided as a "spawn directive". The spawn directive allows processing options to be specified for commands. The spawn directive can accept a task that includes statements and service calls. Here, the spawn directive is a synchronous directive where control passes from an invoking thread into an infrastructure thread generator, which creates and starts each thread. Control returns to the invoking thread after all generated child threads are terminated. In the interim, the invoking thread monitors the status of each child thread and collects results returned from the child thread when the child thread terminates. In this manner, the template provides the tester with a mechanism to create a managed collection of concurrent threads, and recursively, nested thread trees.

Through the concurrency testcase template, a tester may further input directives for customizing actions of each concurrent thread (211). The tester thus may control what happens inside each code block to be tested. Service calls may be used to delegate complex tasks, where the tasks are broken down into sub-tasks. Each sub-task can be assigned to an individual thread. FIG. 3 illustrates an example spawn syntax according to the present invention. In this example, the task is broken down into three sub-tasks, which are assigned to five threads. The choice of assignment and sub-task is delegated to the tester. Each thread sequences through the statements and service calls in the task that is assigned to it. The service call can accept parameters and return results, as well as handle errors. Each thread can introduce variables by assigning them, as well as read variables that were assigned prior to the spawn. The variables are local to the thread so any updates are localized. In this embodiment, global variables are avoided to avoid race conditions, which can cause tests to behave differently each time, as the identification of race conditions is typically outside the skills of testers.

In some scenarios, the testcase requires the threads to execute a sequence of tests in a predetermined order. In these testcases, the concurrency testcase template gives the tester the ability to input directives to sequence the threads (212). This gives control over scheduling to the tester. For example, the testcase may include a test of the implementation of an isolation level in databases where a table row update by one thread may or not be visible to another thread. Here, the read must be ensured to follow the update. Conventional programming languages offer wait-signal mechanisms where one thread can suspend and resume on a signal that originates from another thread. However, the use of these mechanisms is typically outside the programming skills of testers. To address this, the present invention provides directives for the exchange of information between concurrent threads (213). In this embodiment, the directives comprise "receive_from <n>" and "send_to <m>". The "receive_from<n>" directive suspends a thread until it receives a message from thread n. The "send_to <m>" directive sends a message from a thread to thread m. These directives result in the threads exchanging signal-like messages. The testcase generation or infrastructure can implement the signaling using an internal semaphore, which is owned by the parent thread that invoked it. This signaling mechanism can be extended with optional message passing. For example, the "receive_from <n>" directive can be implemented as a message being returned for possible assignment to a variable and subsequent evaluation, and a message can be sent to another thread using a "send_to <m> <message>" directive. Besides the signaling, the testcase generation infrastructure can implement message passing using blocking queues which are both a semaphore and a data store, without the tester needing to know how to program blocking queues. In this manner, the concurrency testcase template provides a mechanism for the tester to sequence the threads, and a mechanism for concurrent threads to exchange information in order to influence subsequent control flow, while masking the programming complexities from testers.

Through the concurrency testcase template, a tester may input directives to increase throughput by configuring the number of active threads to the number of central processing units (CPUs) available to process the threads. Throughput drops significantly with increasing thread count when the number of CPUs is constant because of increased thread context switching. Throughput also drops when time is lost to thread context switching. Context switching is necessary when the number of active threads is greater than the number of CPUs. In order to give waiting threads a chance to run on a CPU, the thread that is currently being processed by the CPU is switched periodically. Context switching requires the storing and restoring of the states of the threads, which negatively impacts throughput.

Throughput may be improved by limiting the number of active threads to the number of CPUs so that more time is spent on productive work rather than context switching. In this embodiment, this feature is implemented with a thread pool. FIG. 4 illustrates an example spawn syntax for a directive to implement a thread pool according to the present invention. The thread pool is preallocated with as many threads as there are CPUs in the system, and the testcase generation infrastructures executes up to as many tasks as there are threads. When a task finishes, the thread is returned to the pool to await another task. This reuse avoids the overhead of destroying threads only to regenerate them, time which can otherwise be used for productive work. Although thread pooling is known, the interface to the thread pool, as well as thread management and task assignment, require advanced programming skills that testers typically lack. The template allows the tester to enable a thread pool without needing to have these programming skills. In this embodiment, thread pooling is disabled by default. The tester may control the enablement of thread pooling without having programming skills by specifying a keyword, such as the keyword 'pool' preceded by a comma with square braces indicating an optional argument, as illustrated in FIG. 4.

Through the concurrency testcase template, a tester may input directives to improve the accuracy of timing tests (203) by having the spawned threads start tasks simultaneously. Through these directives, task execution can be delayed until all threads are created and primed to begin. The testcase generation infrastructure may use a counting semaphore to implement this feature, which is initialized to the number of spawned threads, each of which decrements a counter when it is initialized and ready to execute a task. The threads are started simultaneously when the counter reaches zero, therefore ensuring that no thread gets unfair lead time. The tester may start a timer before calling the spawn and read the elapsed time immediately after. Performance tests that measure the effect of scaling up the number of simultaneous tasks can be written by the tester by timing the spawn in a loop, each time increasing the number of threads. This kind of test is beneficial for understanding the responsiveness or scalability of the software or for understanding the impact of code change on legacy functions of the software. This feature thus allows the tester to improve the accuracy of timing tests without needing the programming skills to use advanced features like counting semaphores. The tester may also override the simultaneous starting of the threads by having one or more threads sleep for an arbitrary amount of time. This capability may help expose race conditions in the software product.

Through the concurrency testcase template, a tester may input directives for configuring the response to errors by concurrent threads (204). In some scenarios, when an error occurs during the execution of statements in a task, the tester may want to control a thread's response to the error. The concurrency testcase template allows testers to provide directives to control the lifetime of a thread tree created by the spawn directive and to prevent an expected error from ending a thread. Services that can encounter errors can accept a list of anticipated nonfatal errors. If the thread encounters an error in the list, the service may be configured to return so that the thread can continue on to the next statement in the subtask. If the error is not in the list, the subtask may be configured to generate an exception that ends the service and propagates the error outward to the spawn. The spawn intercepts the exception and ends the thread as well as any remaining active sibling threads or their descendants. The error propagates further up, recursively ending thread trees, until it ends the main thread and testcase. The testcase may be configured to end abruptly if testing can resume safely, or may be configured to end the threads gracefully by interrupting them, after which it is up to each interrupted thread to determine when to end and what housekeeping tasks it should perform. Besides reacting to error conditions, a thread may be configured to signal its parent spawn directive to end its thread tree by invoking an "end_all" directive. Instead of propagating an error and ending the testcase, the "end_all" directive will cause only the spawn to end, with the parent thread resuming execution of the next statement after the spawn. This feature can be used, for example, when testing the online backup of a table. The tester may create threads to generate stress tests against the table, possibly using the spawn recursively, while one thread performs the online backup. When the online backup is complete, the thread performing the online backup can cause the stressing threads to end efficiently by invoking the "end_all" directive. In this case, all of the sibling threads and any subtrees generated by the sibling threads are gracefully shutdown and control returns to the parent thread that invoked the spawn.

Through the concurrency testcase template, a tester may input directives for configuring the logging of data for the concurrent threads (205). This mechanism implements a facility to log the data and control flow of the various concurrent threads so that there is a trace of the responsibilities of each thread, without the tester needing the programming skills to implement the logging. The data may include timing information that allows the logs to be merged in order to determine the sequence of operations, which is useful during problem determination. Rather than burden the tester with learning how to use a logger, how to ensure logging is synchronized so diagnostics records do not interleave, what format of information to include, etc., the testcase generation infrastructure automatically performs the logging. The template allows a tester to input directives to turn the logging off or to control the level of information to record to limit the impact of logging on execution time. In this embodiment, testers can disable logging with a "silent" directive, can require extensive diagnostics with a more robust "verbose" directive, or configure the recording of warnings or errors with a "error" directive. The services take responsibility for the logging, which may include service entry and exit records to trace the flow of control as well as data values used. Newer log records are appended to the log file, and each record has an associated timestamp. In this embodiment, the tester may further configure the logging with a "file" directive so that log records are written to the file system with one file per thread. Alternatively, the tester may further configure the logging with a "network" directive so that log records are written to a networked device. A merge utility can put the log records from the various logs back in sequence ordered by timestamp, hence providing the tester with a trace of the testcases that were run against a subsystem.

FIG. 5 illustrates an example testcase received from a tester through the concurrency testcase template according to the present invention. This example tests several features in a database. Threads 1, 2, and 3 drive stress tests that populate and query a table simultaneously. Thread 4 drives an online backup, then signals the waiting thread 5 to continue but to first reorganize the subject table. After thread 5 reorganizes the subject table, the thread tree generated by the spawn is taken down after a delay. The elapsed time for the spawn to complete is calculated and can be stored for future reference. This testcase can be replayed for comparison whenever a relevant code path in the database is revised. This enables regression testing, as well as helping to catch performance degradation in advance before adding functions on top of existing code or deploying on a customer system. The logging facility described above records the activities of each thread in a log file, with a log file for each thread. The log files allow a tester to trace the actions taken by a thread or to run a utility to merge the records in chronological order when investigating the overall sequence of actions.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for concurrency testcase generation by a computer system comprising a processor, comprising:
    displaying a concurrency testcase template for features built into a concurrency testcase generation infrastructure that requires no compilation;
    receiving first directives input through the concurrency testcase template for managing activities of concurrent threads;
    receiving second directives input through the concurrency testcase template for configuring timing tests by the concurrent threads;
    receiving third directives input through the concurrency testcase template for configuring responses to errors encountered by the concurrent threads;
    receiving fourth directives input through the concurrency testcase template for configuring logging of data for the concurrent threads;
    creating a concurrency testcase comprising the first, second, third, and fourth directives by the concurrency testcase generation infrastructure; and
    executing the concurrency testcase on an application code by implementing the features built into the concurrency testcase generation infrastructure according to the concurrency testcase, comprising:
        implementing one or more of the following features according to the first directives in the concurrency testcase: assigning tasks to the concurrent threads; setting a sequence of the concurrent threads; implementing signaling for exchange of information between the concurrent threads; and enabling or disabling a thread pool;
        implementing a timer according to the second directives in the concurrency testcase to delay task execution until each thread is created;
        configuring services to respond to the errors encountered by the concurrent threads according to the third directives in the concurrency testcase; and
        implementing a facility to log the data for the concurrent threads according to the fourth directives in the concurrency testcase.

2. A computer program product for concurrency testcase generation, the computer program product comprising:
    a computer readable memory device having computer readable program code embodied therewith, the computer readable program code configured to:
    display a concurrency testcase template for features built into a concurrency testcase generation infrastructure that requires no compilation;
    receive first directives input through the concurrency testcase template for managing activities of concurrent threads;
    receive second directives input through the concurrency testcase template for configuring timing tests by the concurrent threads;
    receive third directives input through the concurrency testcase template for configuring responses to errors encountered by the concurrent threads;
    receive fourth directives input through the concurrency testcase template for configuring logging of data for the concurrent threads;
    create a concurrency testcase comprising the first, second, third, and fourth directives by the concurrency testcase generation infrastructure; and
    execute the concurrency testcase on an application code by implementing the features built into the concurrency testcase generation infrastructure according to the concurrency testcase, further configured to:
        implement one or more of the following features according to the first directives in the concurrency testcase: assigning tasks to the concurrent threads; setting a sequence of the concurrent threads; implementing signaling for exchange of information between the concurrent threads; and enabling or disabling a thread pool;
        implement a timer according to the second directives in the concurrency testcase to delay task execution until each thread is created;
        configure services to respond to the errors encountered by the concurrent threads according to the third directives in the concurrency testcase; and
        implement a facility to log the data for the concurrent threads according to the fourth directives in the concurrency testcase.

3. A system comprising:
    a processor; and
    a computer readable memory device having computer readable program code embodied therewith, the computer readable program code configured to:
    display a concurrency testcase template for features built into a concurrency testcase generation infrastructure that requires no compilation;
    receive first directives input through the concurrency testcase template for managing activities of concurrent threads;
    receive second directives input through the concurrency testcase template for configuring timing tests by the concurrent threads;
    receive third directives input through the concurrency testcase template for configuring responses to errors encountered by the concurrent threads;
    receive fourth directives input through the concurrency testcase template for configuring logging of data for the concurrent threads;
    create a concurrency testcase comprising the first, second, third, and fourth directives; and
    execute the concurrency testcase on an application code by implementing the features built into the concurrency testcase generation infrastructure according to the concurrency testcase, further configured to:
        implement one or more of the following features according to the first directives in the concurrency testcase: assigning tasks to the concurrent threads; setting a sequence of the concurrent threads; implementing signaling for exchange of information between the concurrent threads; and enabling or disabling a thread pool;
        implement a timer according to the second directives in the concurrency testcase to delay task execution until each thread is created;
        configure services to respond to the errors encountered by the concurrent threads according to the third directives in the concurrency testcase; and
        implement a facility to log the data for the concurrent threads according to the fourth directives in the concurrency testcase.

* * * * *